US008078360B2

(12) United States Patent
Sekiya (10) Patent No.: US 8,078,360 B2
(45) Date of Patent: Dec. 13, 2011

(54) CONTROL APPARATUS OF A VARIABLE DAMPING FORCE DAMPER

(75) Inventor: Shigenobu Sekiya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 693 days.

(21) Appl. No.: 12/187,670

(22) Filed: Aug. 7, 2008

(65) Prior Publication Data

US 2009/0043452 A1 Feb. 12, 2009

(30) Foreign Application Priority Data

Aug. 8, 2007 (JP) ................................. 2007-206203

(51) Int. Cl.
*B60G 17/016* (2006.01)
*B60G 17/018* (2006.01)

(52) U.S. Cl. .................... 701/37; 188/267.2; 188/266.1; 280/5.515

(58) Field of Classification Search .................... 180/41; 188/266.1, 267, 267.2; 267/140.14, 140.15; 280/5.512, 5.515; 303/148–150; 701/37, 701/38, 40, 80
See application file for complete search history.

(56) References Cited

U.S. PATENT DOCUMENTS

| 4,787,650 | A | * | 11/1988 | Doi et al. ................... 280/5.515 |
| 4,984,820 | A | * | 1/1991 | Uchiyama et al. .......... 280/5.519 |
| 5,041,977 | A | * | 8/1991 | Kawabata ..................... 701/39 |
| 5,090,728 | A | * | 2/1992 | Yokoya et al. .............. 280/5.519 |
| 5,301,111 | A | * | 4/1994 | Utsui et al. ..................... 701/37 |
| 5,377,107 | A | | 12/1994 | Shimizu et al. |
| 5,467,280 | A | * | 11/1995 | Kimura ............................. 701/37 |
| 5,740,039 | A | * | 4/1998 | Hirahara et al. ................ 701/37 |
| 6,633,803 | B1 | * | 10/2003 | Shal et al. ........................ 701/37 |
| 7,825,786 | B2 | * | 11/2010 | Nishioka et al. .............. 340/441 |
| 7,904,221 | B2 | * | 3/2011 | Oikawa et al. .................. 701/37 |
| 2005/0178628 | A1 | | 8/2005 | Uchino et al. |
| 2006/0224285 | A1 | | 10/2006 | Izawa et al. |

FOREIGN PATENT DOCUMENTS

| EP | 0 151 421 | 8/1985 |
| JP | 61-001520 | 1/1986 |
| JP | 4-090915 | 3/1992 |
| JP | 6-048142 | 2/1994 |
| JP | 6-278638 | 10/1994 |
| JP | 7-25257 | 1/1995 |
| JP | 11-078467 | 3/1999 |
| JP | 2003-104024 | 4/2003 |
| JP | 2006-273222 | 10/2006 |
| JP | 2006-273223 | 10/2006 |
| JP | 2006-281876 | 10/2006 |
| JP | 2006-321258 | 11/2006 |

* cited by examiner

*Primary Examiner* — Paul N Dickson
*Assistant Examiner* — Laura Freedman
(74) *Attorney, Agent, or Firm* — Rankin, Hill & Clark LLP

(57) ABSTRACT

A control apparatus of a variable damping force damper comprises first and second low-pass filters for cutting off high frequency components of a target current of the damper, where the first and second low-pass filters have different response characteristics. The control apparatus further comprises a low-pass filter selection unit for selecting one of the first and second low-pass filters based on at least one of the dynamic state of the vehicle body and the road surface condition.

14 Claims, 12 Drawing Sheets

CONTROL APPARATUS OF A VARIABLE DAMPING FORCE DAMPER

TECHNICAL FIELD

The present invention relates to a control apparatus of a variable damping force damper of a current control type, and particularly relates to a control apparatus of a variable damping force damper that can achieve both of favorable riding comfort and high driving stability.

BACKGROUND OF THE INVENTION

In recent years, in a field of cylinder-type dampers used in a vehicle suspension system, various types of variable damping force dampers have been developed to variably control the damping force depending on dynamic states of the vehicle in order to achieve both of favorable riding comfort and high driving stability. In the past, variable damping force dampers of a mechanical type were common in which a rotary valve is provided to the piston to variably control a flow area of an orifice and the rotary valve is rotatably driven by an actuator. However, in order to simplify the structure and improve the control response time, variable damping force dampers of an MRF type have been developed in recent years, in which a magneto-rheological fluid (MRF) is used as an operating oil and the piston is provided with a magnetizable liquid valve (MLV) for controlling an apparent viscosity of the MRF (see United States Patent Application Publication No. 2006/0224285, for example).

In general, in a damper control apparatus for controlling the MRF-type variable damping force damper, a target damping force setting means sets a target damping force for each wheel according to a lateral acceleration, longitudinal acceleration, etc. of the vehicle body, and thereafter, a target current setting means sets a target current for each MLV according to the target damping force and a stroke speed of the damper. Typically, the lateral acceleration, longitudinal acceleration, damper stroke speed, etc. are detected by various sensors (lateral G sensor, longitudinal G sensor, stroke sensor, etc.) disposed at appropriate portions of the vehicle body and suspension system, and the detection signals from the sensors tend to include various high frequency noises. For this reason, it has been proposed to use a low-pass filter having a predetermined cut-off frequency to remove or reduce the high frequency noises from the detection signals of the sensors or target current, thereby improving the control reliability (see Japanese Patent Application Publication No. 7-25257 and Japanese Patent Application Publication No. 6-278638, for example).

Figure 11:
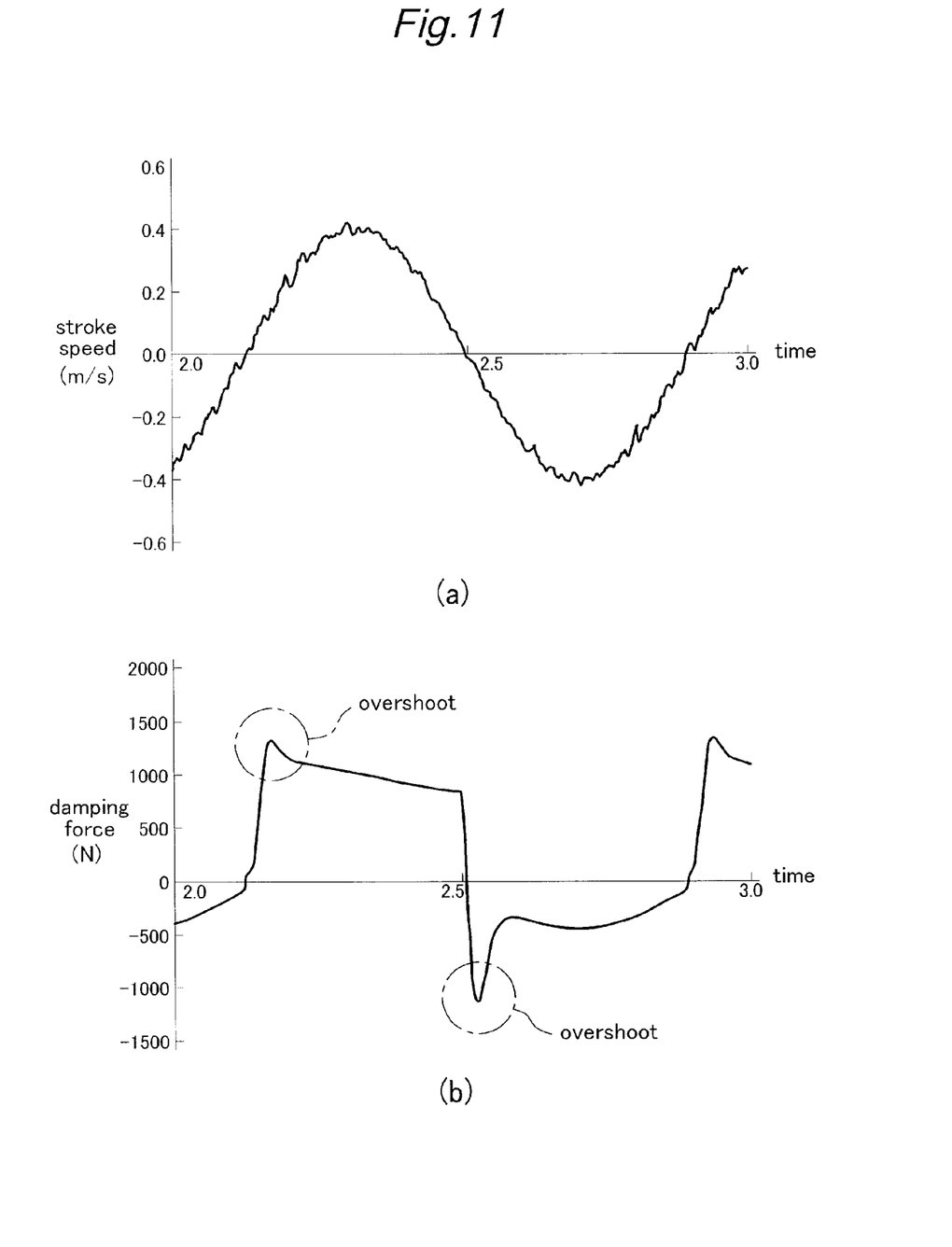
FIGS. 11(a) and 11(b) are graphs showing a change of the stroke speed and damping force regarding a conventional embodiment when the vehicle is traveling on a road with a rough surface.
Figure 12:
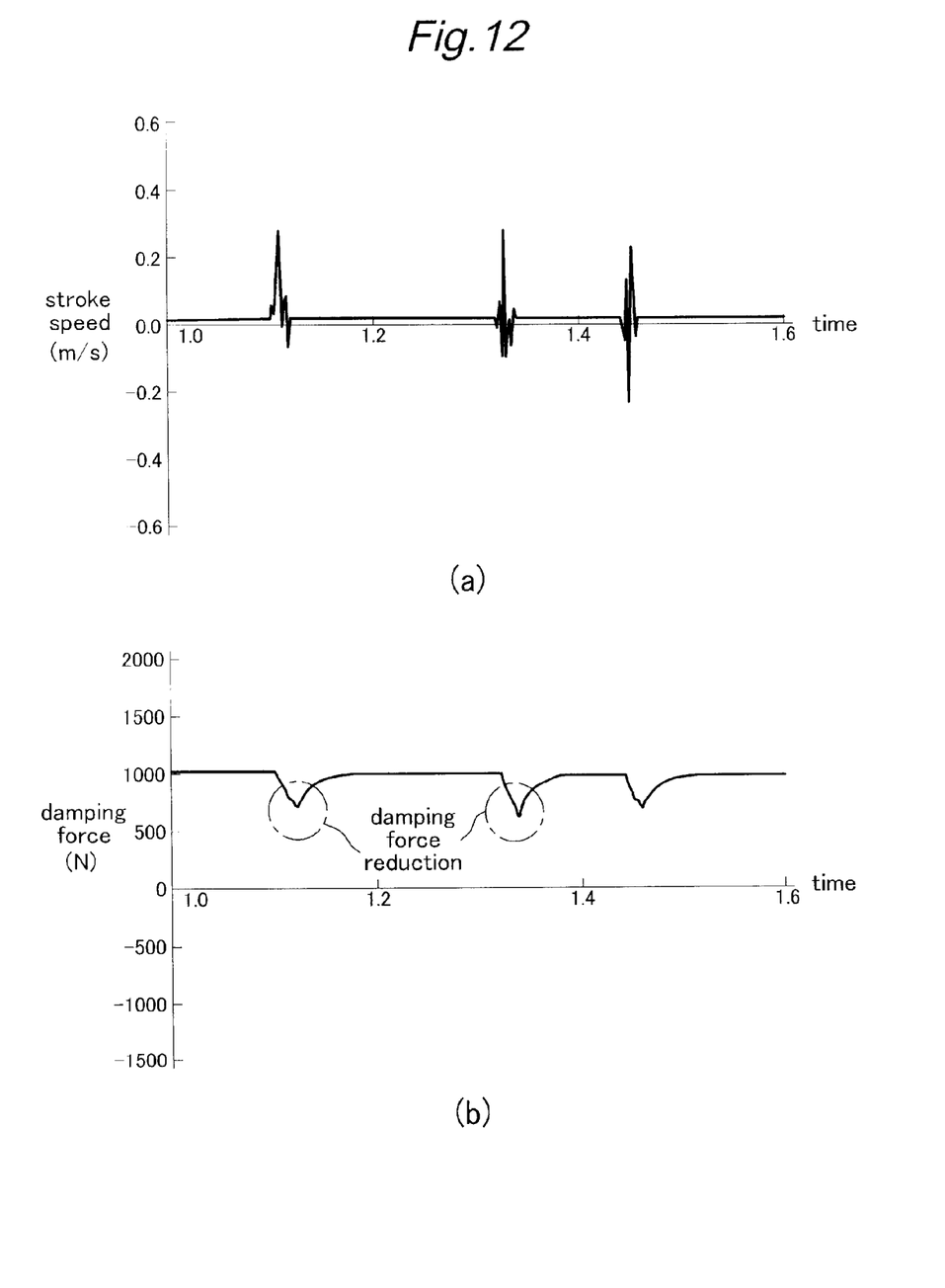
FIGS. 12(a) and 12(b) are graphs showing a change of the stroke speed and damping force regarding a conventional embodiment when the vehicle is traveling on a road with a flat surface.

The low-pass filters disclosed in JPA No. 7-25257 and JPA No. 6-278638 serve to remove high frequency components from the detection signals with a prescribed response characteristic, but there was a problem arising therefrom. For example, when an automobile is running meanderingly on a road having surface irregularities, the detection signal from the stroke sensor (e.g., stroke speed) may oscillate at a frequency near a sprung mass resonance frequency and the direction of the stroke speed, which can be expressed by positive and negative signs, may change accordingly, as show in FIG. 11(a). If the low-pass filter is given a low response characteristic, the damping force (or the target current) tends to overshoot at the points where the direction of damping force changes as shown in FIG. 11(b), and this can deteriorate the riding comfort. On the other hand, when an automobile is turning steadily on a flat road surface, for example, the detection signal from the stroke sensor is generally kept near zero as shown in FIG. 12(a), but high frequency noises generated from the lateral G sensor or stroke sensor itself are sometimes added onto the detection signal. In such a case, if the low-pass filter is given a high response characteristic, an amount of reduction of the damping force caused by the high frequency noises can be undesirably large, and this may unfavorably affect smooth attitude control of the automobile and deteriorate the driving stability.

BRIEF SUMMARY OF THE INVENTION

The present invention has been made to solve the above prior art problems, and a primary object of the present invention is to provide a control apparatus of a variable damping force damper that can achieve both of favorable riding comfort and high driving stability.

According to the present invention, there is provided a control apparatus of a variable damping force damper of a current control type used to suspend a vehicle body of a vehicle, comprising; a dynamic state sensor for detecting a dynamic state of the vehicle body, a road surface condition determination unit for determining a surface condition of a road on which the vehicle is traveling, and a target damping force setting unit for setting a target damping force of the variable damping force damper based on the dynamic state of the vehicle body detected by the dynamic state sensor. The control apparatus further comprising a target current setting unit for setting a target current for the variable damping force damper based on the target damping force set by the target damping force setting unit and a stroke speed of the variable damping force damper, a first low-pass filter for cutting off high frequency components of the target current, and a second low-pass filter for cutting off high frequency components of the target current. The second low-pass filter having a different response characteristic from that of the first low-pass filter. The control apparatus also comprising a low-pass filter selection unit for selecting one of the first and second low-pass filters based on at least one of the dynamic state of the vehicle body detected by the dynamic state sensor and the road surface condition determined by the road surface condition determination unit.

According to such a structure, it is possible to achieve both of favorable riding comfort and high driving stability by selectively utilizing the first and second low-pass filters having different response characteristics depending on the road surface conditions and/or dynamic state of the vehicle body.

Preferably, the road surface condition determination unit determines the road surface condition based on at least one of an operating state of the variable damping force damper and a vertical dynamic state of the vehicle body. In this way, the road surface condition can be determined by using the stroke sensor and/or vertical G sensor which are usually equipped to the vehicle, and hence it is possible to suppress the increase of cost.

More preferably, the road surface condition determination unit calculates an oscillation frequency of the variable damping force damper based on the stroke speed, and determines the road surface condition based on the oscillation frequency. This can contribute to reliably detecting the irregularities of the road surface.

In one embodiment, the road surface condition determination unit determines that the road surface has irregularities when the stroke speed exceeds a higher threshold value within a predetermined time period from a point where the stroke speed last becomes lower than a lower threshold value or when the stroke speed becomes lower than the lower threshold value within the predetermined time period from a point where the stroke speed last exceeds the higher threshold value, and otherwise determines that the road surface is flat, the prescribed time period being a half of one cycle of a sprung mass resonance frequency. This can avoid erroneously determining that the road surface has irregularities when the vehicle passes over a dip or bump on a flat road surface.

Also preferably, the low-pass filter selection unit selects one of the first and second low-pass filters that has a higher response characteristic when the road surface condition determination unit determines that the road surface has irregularities. In this way, the high response characteristic of the selected low-pass filter can suppress the overshoot of the damping force (or target current) at the points where the direction of the damping force of the damper changes, and thus can avoid deterioration of riding comfort.

In the case that the target damping force setting unit provides a signal that can indicate whether or not an attitude control of the vehicle is conducted to the low-pass filter selection unit, when the road surface condition determination unit determines that the road surface is flat, the low-pass filter selection unit may determine whether or not the attitude control of the vehicle body is conducted based on the signal from the target damping force setting unit and select one of the first and second low-pass filters that has a higher response characteristic when it is determined that the attitude control of the vehicle is not conducted. In this way, if the vehicle passes small bumps and dips while traveling straight, the high response characteristics of the selected low-pass filter allow the damping force of the damper to change quickly to thereby prevent deterioration of the riding comfort.

Also, the low-pass filter selection unit may select one of the first and second low-pass filters that has a lower response characteristic when it is determined that the road surface is flat and that the attitude control of the vehicle is conducted. In this way, when the vehicle is turning steadily on a flat road surface, if high frequency noises are added to the detected stroke speed, the decrease of the damping force due to the high frequency noises can be controlled to a moderate degree by the low response characteristic of the selected low-pass filter, and therefore smooth attitude control of the vehicle body can be maintained.

According to another aspect of the present invention, there is provided a method for controlling a variable damping force damper of a current control type used to suspend a vehicle body of a vehicle. The method comprising the steps of: detecting a dynamic state of the vehicle body, determining a surface condition of a road on which the vehicle is traveling, and setting a target damping force of the variable damping force damper based on the dynamic state of the vehicle body. The method further comprising the steps of detecting a stroke speed of the variable damping force damper, setting a target current for the variable damping force damper based on the target damping force and the stroke speed, and cutting off high frequency components of the target current with a low-pass filter. The step of cutting off high frequency components comprises a step of selecting one of a first low-pass filter and a second low-pass filter based on at least one of the dynamic state of the vehicle body and the road surface condition, the first and second low-pass filters having different response characteristics from each other.

Other features, objects and advantages of the present invention will be appreciated more fully from the following description with reference to appended drawings.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
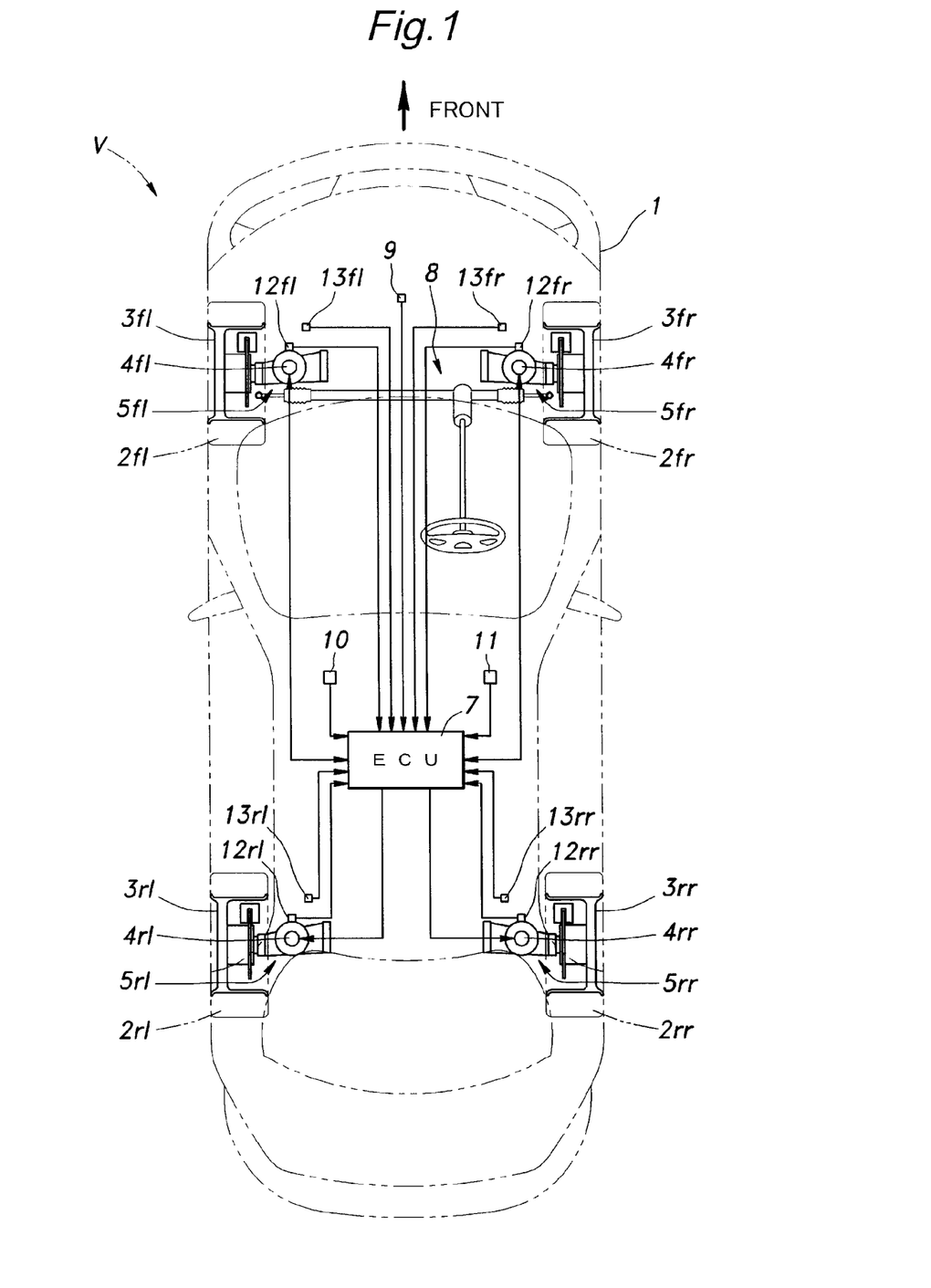
FIG. 1 is a general structural view of a four-wheeled automobile regarding an embodiment of the present invention.
Figure 2:
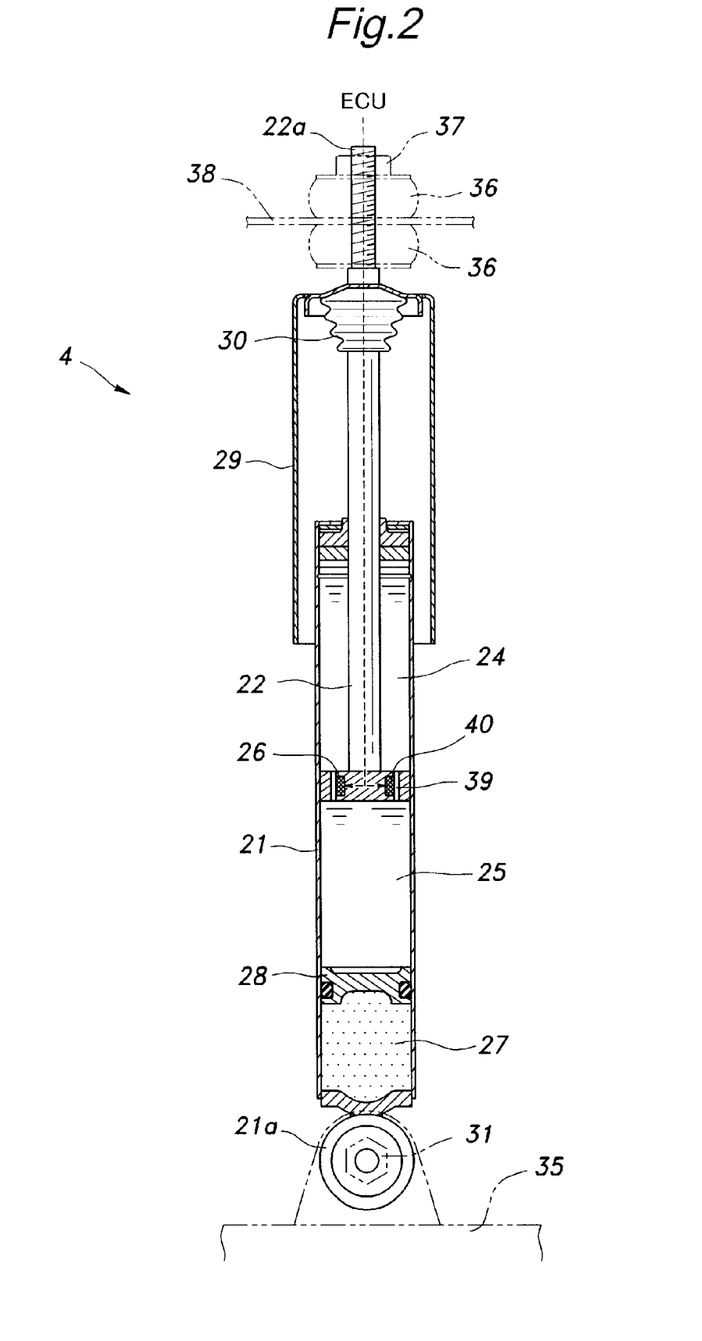
FIG. 2 is a longitudinal cross-sectional view of a damper regarding the embodiment.
Figure 3:
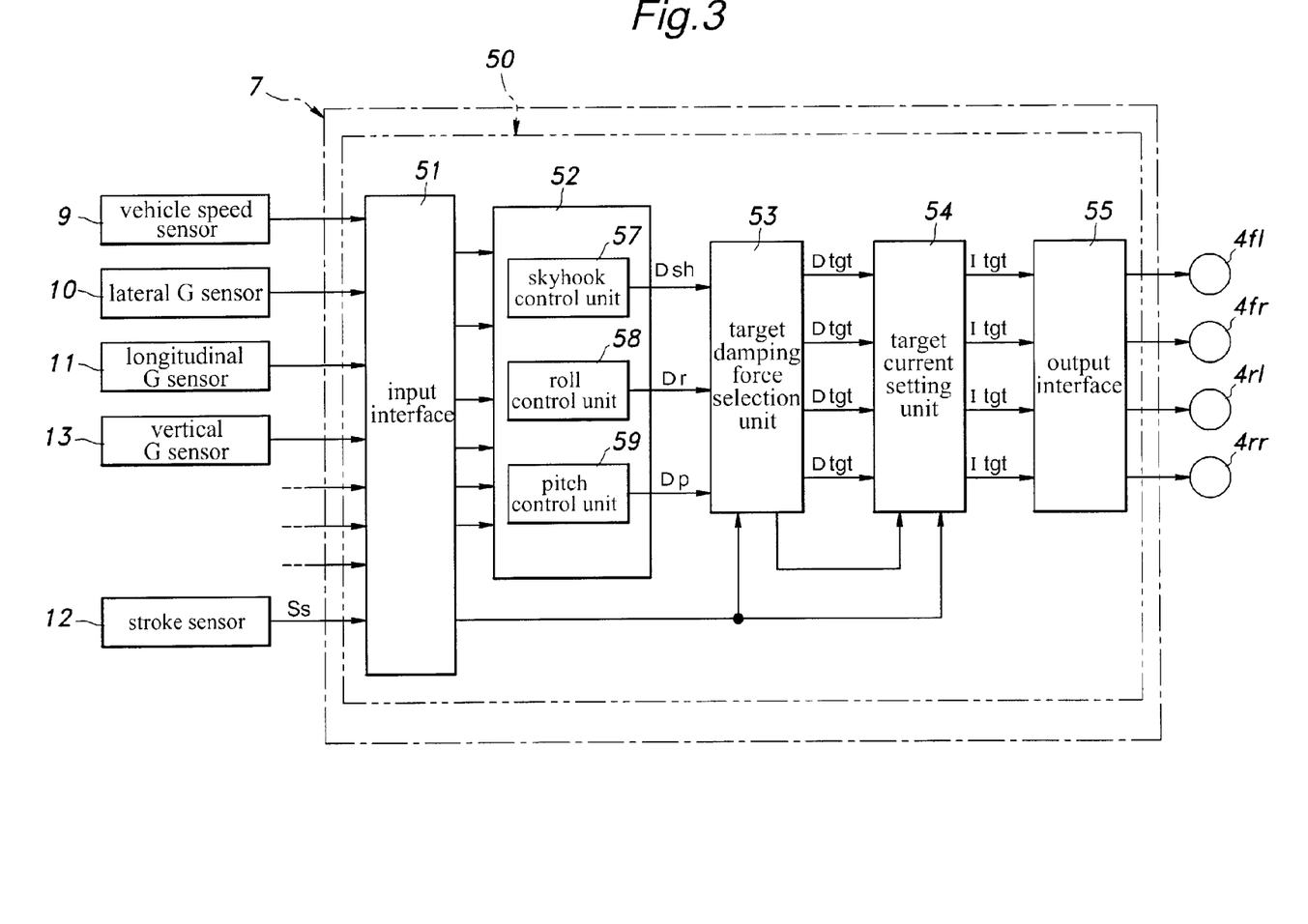
FIG. 3 is a block diagram showing a general structure of a damper control apparatus regarding the embodiment.
Figure 4:
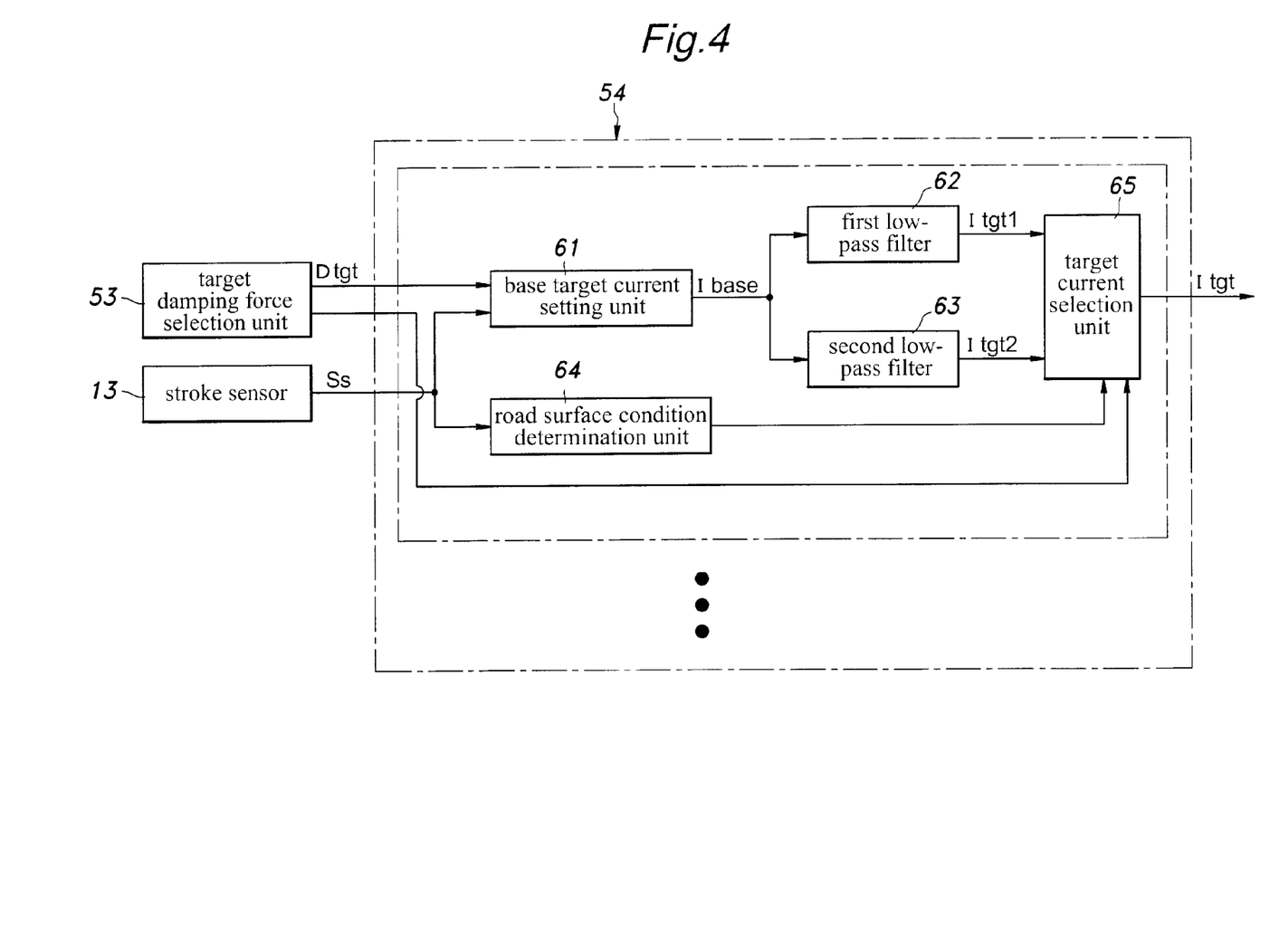
FIG. 4 is a block diagram showing a general structure of a target current setting unit regarding the embodiment.

Referring to the drawings, a preferred embodiment of the present invention will be described in detail hereinafter, in which the present invention is applied to a four-wheeled automobile. FIG. 1 is a general structural view of the four-wheeled automobile to which the present invention is applied, FIG. 2 is a longitudinal cross-sectional view of a damper regarding the embodiment, FIG. 3 is a block diagram showing a general structure of a damping force control apparatus regarding the embodiment, and FIG. 4 is a block diagram showing a general structure of a target current setting unit regarding the embodiment.

<General Structure of Automobile>

First, with reference to FIG. 1, an explanation is made to a general structure of an automobile V to which the invention is applied. It should be noted that in the following explanation, reference signs designating the four wheels 3 and devices provided therefor comprise a number followed by a pair of alphabets indicating the position thereof. For example, the front left wheel is designated with "3fl", front right wheel is designated with "3fr", rear left wheel is designated with "3rl", and rear right wheel is designated with "3rr". When referring to the wheels as a whole, only the number (3) is used such as "wheels 3".

As shown in FIG. 1, the automobile (vehicle) V comprises four wheels 3 each of which is fitted with a tire 2, and each wheel 3 is suspended from a vehicle body 1 by means of a suspension 5 constituted by a suspension arm, spring, MRF-type variable damping force damper (simply referred to as damper, hereinafter) 4, and so on. The automobile V further comprises an ECU (Electronic Control Unit) 7 for controlling the suspension system, and an EPS (Electronic Power Steering) 8. Also, the automobile V comprises a vehicle speed sensor 9 for detecting a vehicle traveling speed, a lateral G sensor 10 for detecting a lateral acceleration, a longitudinal G sensor 11 for detecting a longitudinal acceleration, which are disposed at appropriate locations of the vehicle body 1. Further, a stroke sensor 12 for detecting a displacement of the damper 4 and a vertical G sensor 13 for detecting a vertical acceleration of a portion near a wheel house are provided for each wheel 3. It should be noted that an actual stroke speed Ss of the damper 4 can be obtained by differentiating the displacement of the damper 4 detected by the stroke sensor 12, and thus the stroke sensor 12 can serve as stroke speed sensor.

The ECU 7 is constituted by a microcomputer, ROM, RAM, peripheral circuits, input/output interface, various driver circuits and so on, and is connected to the damper 4 of each wheel 3 as well as to the sensors 9-13 via a communication network, which in this embodiment consists of a CAN (Controller Area Network).

<Structure of Damper>

As shown in FIG. 2, the damper 4 of this embodiment is of a mono tube type (De Carbon type), and comprises a cylindrical cylinder tube 21 filled with an MRF (Magneto-Rheological Fluid), a piston rod 22 received in the cylinder tube 21 so as to be slidable in an axial direction, a piston 26 attached to an end of the piston rod 22 to partition the inner space of the cylinder tube 21 into an upper oil chamber 24 and a lower oil chamber 25, a free piston 28 that defines a high pressure gas chamber 27 in a lower part of the cylinder tube 21, a cover 29 for preventing dust from adhering to the piston rod 22 or the like, and a bump stop 30 for absorbing an impact in a full bound.

The cylinder tube 21 is connected to an upper surface of a trailing arm 35, which is a member on a wheel side, by means of a bolt 31 passed through an eye piece 21a provided at a lower end of the cylinder tube 21. The piston rod 22 is provided with a stud 22a at an upper end thereof, and the stud 22a is connected to a damper base (wheel house upper portion) 38, which is a member on a vehicle body side, by means of upper and lower bushes 36 and a nut 37.

The piston 26 is formed with an annular connection passage 39 for connecting the upper oil chamber 24 and the lower oil chamber 25 to each other, and is provided with an MLV coil 40 disposed inward of the annular connection passage 39. When an electric current is supplied to the MLV coil 40 from the ECU 7, a magnetic field is applied to the MRF flowing through the annular connection passage 39 whereby ferromagnetic particles form chain-like clusters to increase an apparent viscosity of MRF flowing through the annular connection passage 39.

<General Structure of Damper Control Apparatus>

The ECU 7 includes a damper control apparatus 50 having a general structure as shown in FIG. 3. As shown, the damper control apparatus 50 comprises an input interface 51 to which the sensors 9-13 are connected. The damper control apparatus 50 further comprises a target damping force calculating unit 52 for calculating one or more target damping force values (or control target values) of each damper 4 based on the signals from the sensors 9-13. In this embodiment, the target damping force calculating unit 52 includes a skyhook control unit 57 that calculates a skyhook control target value Dsh for conducting a skyhook control, a roll control unit 58 that calculates a roll control target value Dr for conducting a roll control, and a pitch control unit 59 that calculates a pitch control target value Dp for conducting a pitch control. The three control target values of each damper 4 are input to a target damping force selection unit 53 which selects one of the three control target values as a target damping force Dtgt. The selected target damping force Dtgt of each damper 4 is forwarded to a target current setting unit 54 for setting a target current Itgt for each damper 4 (MLV coil 40) according to the target damping force Dtgt and a signal (e.g., stroke speed Ss) from the stroke sensor 12. The damper control apparatus 50 further comprises an output interface 55 for supplying each damper 4 with drive current according to the target current Itgt set by the target current setting unit 54. The target damping force selection unit 53 also provides the target current setting unit 54 with a signal indicating whether or not an attitude control of the vehicle is conducted (i.e., whether or not the roll control target value Dr or the pitch control target value Dp is selected by the target damping force selection unit 53 as the target damping force Dtgt).

<Target Current Setting Unit>

As shown in FIG. 4, the target current setting unit 54 comprises a base target current setting unit 61 for setting a base target current Ibase based on the target damping force Dtgt from the target damping force selection unit 53 and the stroke speed Ss from the stroke sensor 12. The stroke speed Ss is also input to a road surface condition determination unit 64, which determines a road surface condition based on the stroke speed Ss. The target current setting unit 54 further comprises a first low-pass filter 62 for processing the base target current Ibase from the base target current setting unit 61 with a predetermined response characteristic and a second low-pass filter 63 for processing the base target current Ibase with a response characteristic lower than that of the first low-pass filter 62. Outputs Itgt1 and Itgt2 of the first and second low-pass filters 62, 63, respectively, are input to a target current selection unit 65, which selects one of the outputs Itgt1 and Itgt2 of the first and second low-pass filters 62, 63 according to the determination result from the road surface condition determination unit 64 and the input signal from the target damping force selection unit 53 indicating whether or not an attitude control of the vehicle is conducted. It should be noted that the above structure constituted by the base target current setting unit 61, low-pass filters 62, 62, road surface condition determination unit 64, and target current selection unit 65 may be provided for each wheel 3.

<Function>

<Damping Force Control>

Figure 5:
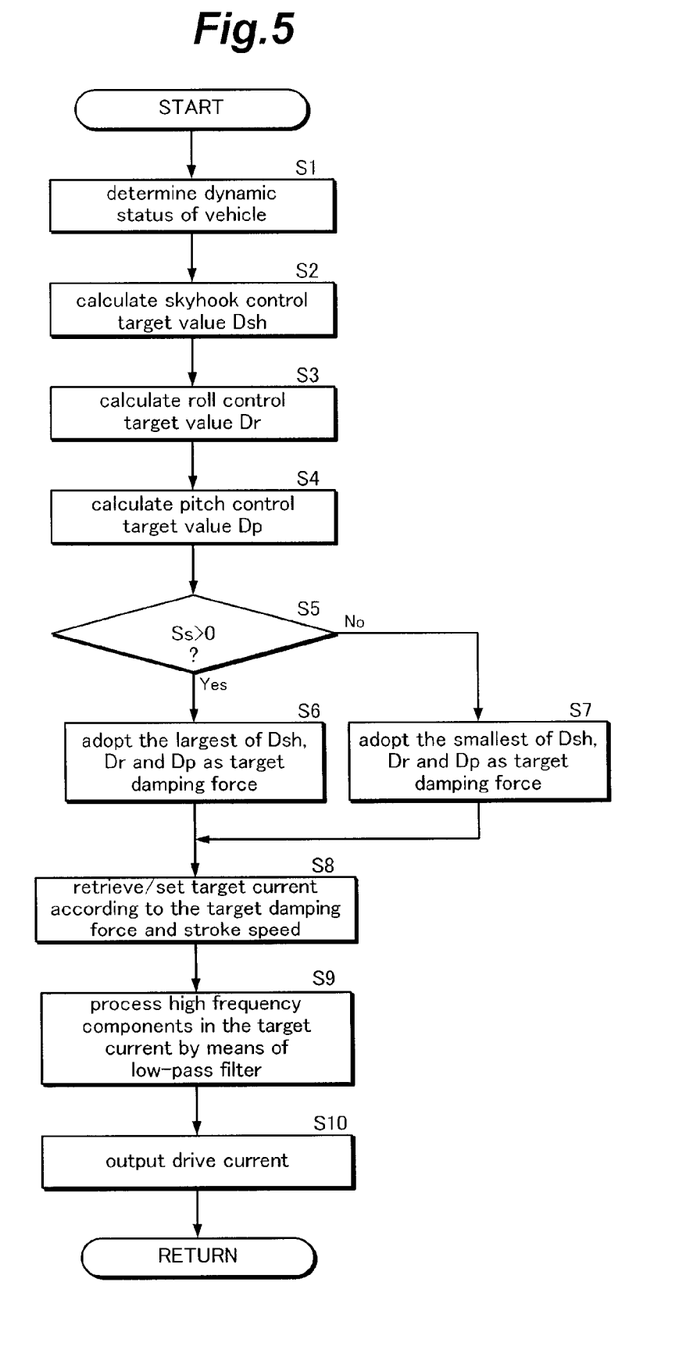
FIG. 5 is a flowchart showing the steps for damping force control regarding the embodiment.

When the automobile has started moving, the damper control apparatus 50 conducts a damping force control as shown in the flowchart of FIG. 5 at predetermined processing intervals (e.g., every 2 ms). Upon start of the damping force control, in step S1, the damper control apparatus 50 determines a dynamic state of the automobile V based on dynamic state quantities such as the accelerations of the vehicle body 1 obtained by the lateral G sensor 10, longitudinal G sensor 11 and vertical G sensor 13, the vehicle speed input from the vehicle speed sensor 9, and a steering speed input from a steering angle sensor (not shown in the drawings). Then, the damper control apparatus 50 calculates the skyhook control target value Dsh, roll control target value Dr, and pitch control target value Dp in steps S2, S3 and S4, respectively, for each damper 4.

Subsequently, the damper control apparatus 50 determines whether or not the stroke speed Ss of each damper 4 is positive in step S5, and if the determination result is "Yes" (i.e., the damper 4 is being expanded), sets the largest of the three control target values Dsh, Dr and Dp as the target damping force Dtgt in step S6. If the determination result in step S5 is "No" (i.e., the damper 4 is being contracted), the damper control apparatus 50 sets the smallest of the three control target values Dsh, Dr and Dp as the target damping force Dtgt in step S7.

Figure 6:
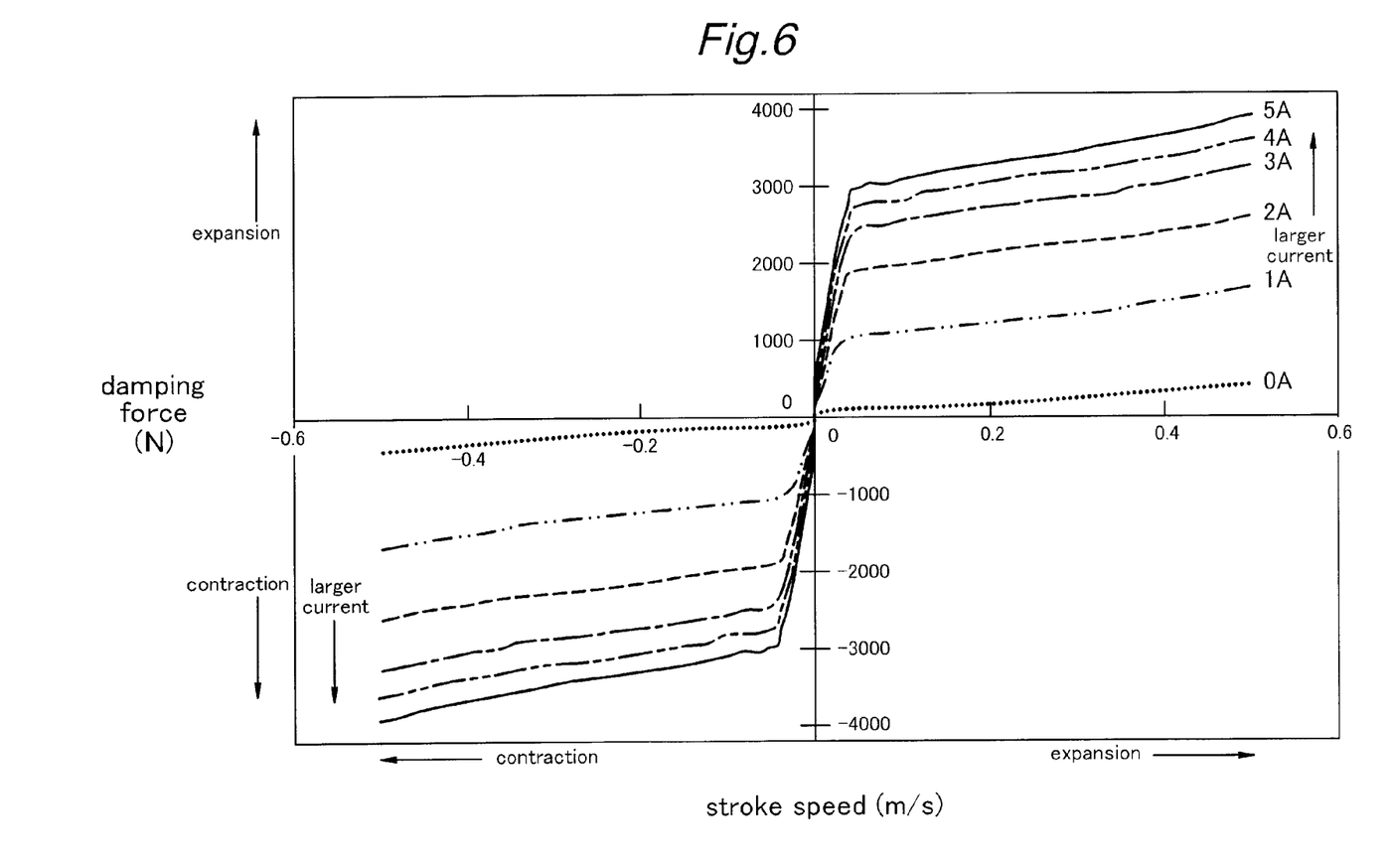
FIG. 6 is a target current map regarding the embodiment.

After the target damping force Dtgt is set in step S6 or S7, in step S8, the damper control apparatus 50 retrieves/sets the target current Itgt from a target current map shown in FIG. 6.

Then, the damper control apparatus 50 processes high frequency components of the target current Itgt by means of a low-pass filter (first low-pass filter 62 or second low-pass filter 63) in step S9, and outputs the drive current according to the target current Itgt in step S10.

<Target Current Selection Control>

Figure 7:
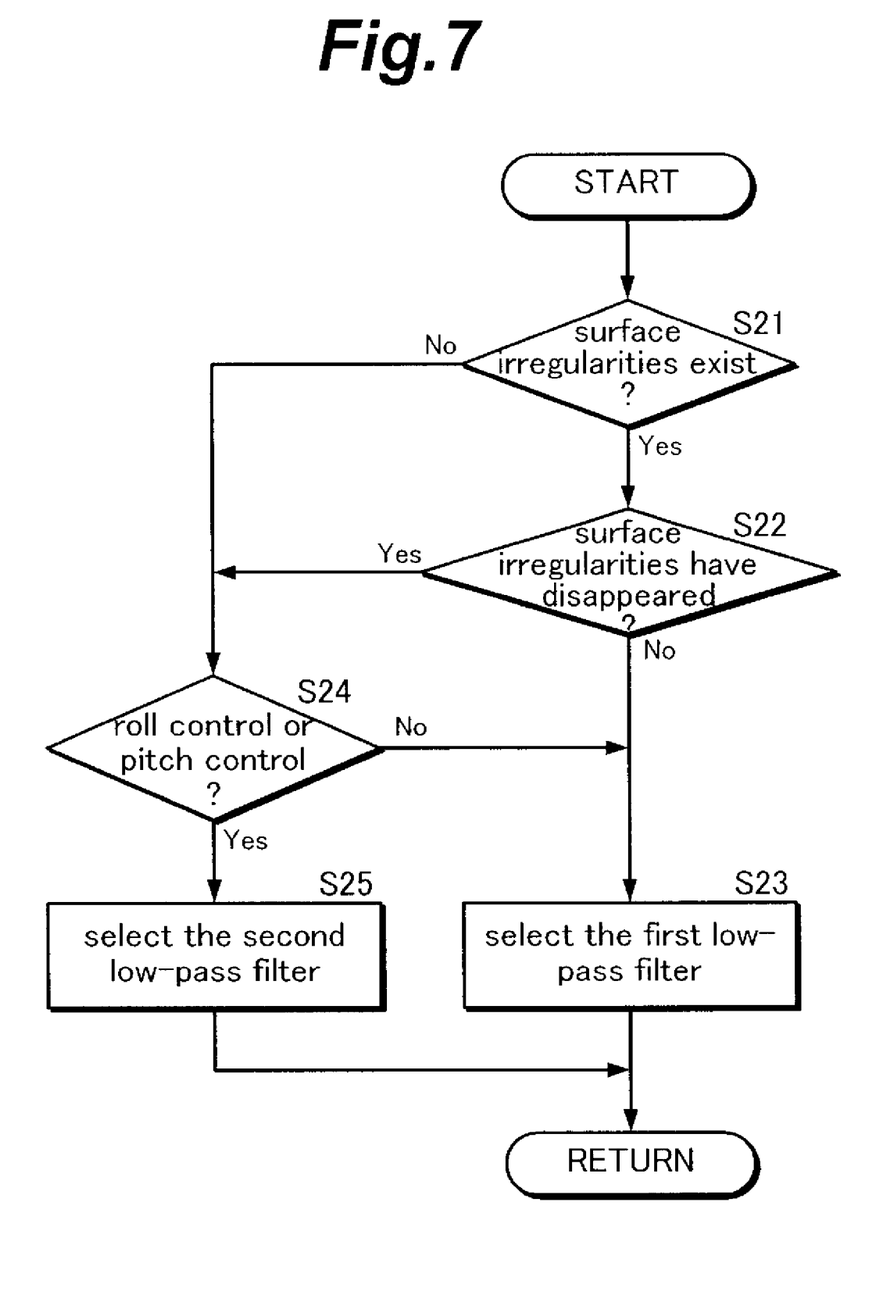
FIG. 7 is a flowchart showing the steps for selecting the target current regarding the embodiment.
Figure 8:
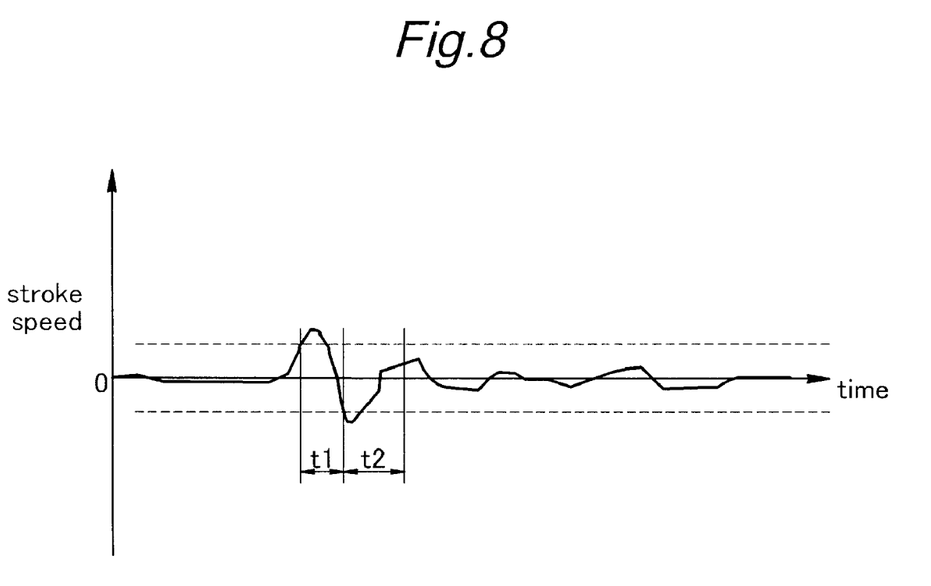
FIG. 8 is a graph showing a change of a stroke speed regarding the embodiment when the vehicle is running.

In parallel with the above described damping force control, the damper control apparatus 50 conducts a target current selection control according to the procedure shown in the flowchart of FIG. 7. Upon start of the target current selection process, in step S21, the damper control apparatus 50 determines the condition of the road surface on which the automobile V is currently traveling based on an oscillation frequency of the damper 4 obtained from the stroke speed Ss. For example, as shown in FIG. 8, when the value of the stroke speed Ss of the damper 4 exceeds a positive threshold value near zero (the positive threshold value is indicated by an upper horizontal broken line in FIG. 8), a time period from the time when the stroke speed Ss exceeds the positive threshold value to the time when the stroke speed Ss becomes lower than a negative threshold value near zero (the negative threshold value is indicated by a lower horizontal broken line in FIG. 8) is measured as a time period t1. Then, the oscillation frequency of the damper 4 is obtained as an inverse of the time period t1 multiplied by two (1/(2×t1)). If the thus-obtained oscillation frequency of the damper 4 is higher than a sprung mass resonance frequency, it is determined that there are surface irregularities on the road, and the process proceeds to step S22, and if not, it is determined that the road surface is flat, and the process proceeds to step S24. It should be noted that the time period t1 may be alternatively measured as a time period from the time when the stroke speed Ss becomes lower than the negative threshold value to the time when the stroke speed Ss becomes greater than the positive threshold value.

In step S22, if the stroke speed Ss exceeds the positive threshold value again during a time period t2 from the point where the stroke speed Ss becomes lower than the negative threshold value, where the time period t2 is a half of one cycle of a sprung mass resonance frequency, it is determined that an oscillation having a frequency higher than the sprung mass resonance frequency is continuously being generated (i.e., the road surface is rough or irregular) and the process proceeds to step S23. On the other hand, if the stroke speed Ss does not exceed the positive threshold value during the time period t2, it is determined that the oscillation having a frequency higher than the sprung mass resonance frequency has ceased being generated, indicating that the surface irregularities have disappeared (i.e., the road surface condition has changed from a rough one to a smooth one), and the process proceeds to step S24. It should be noted that in the case that the time period t1 is measured in step S21 as a time period from the time when the stroke speed Ss becomes lower than the negative threshold value to the time when the stroke speed Ss becomes greater than the positive threshold value, then the determination in step S22 should be made on whether the stroke speed Ss becomes lower than the negative threshold value during the time period t2.

Figure 9:
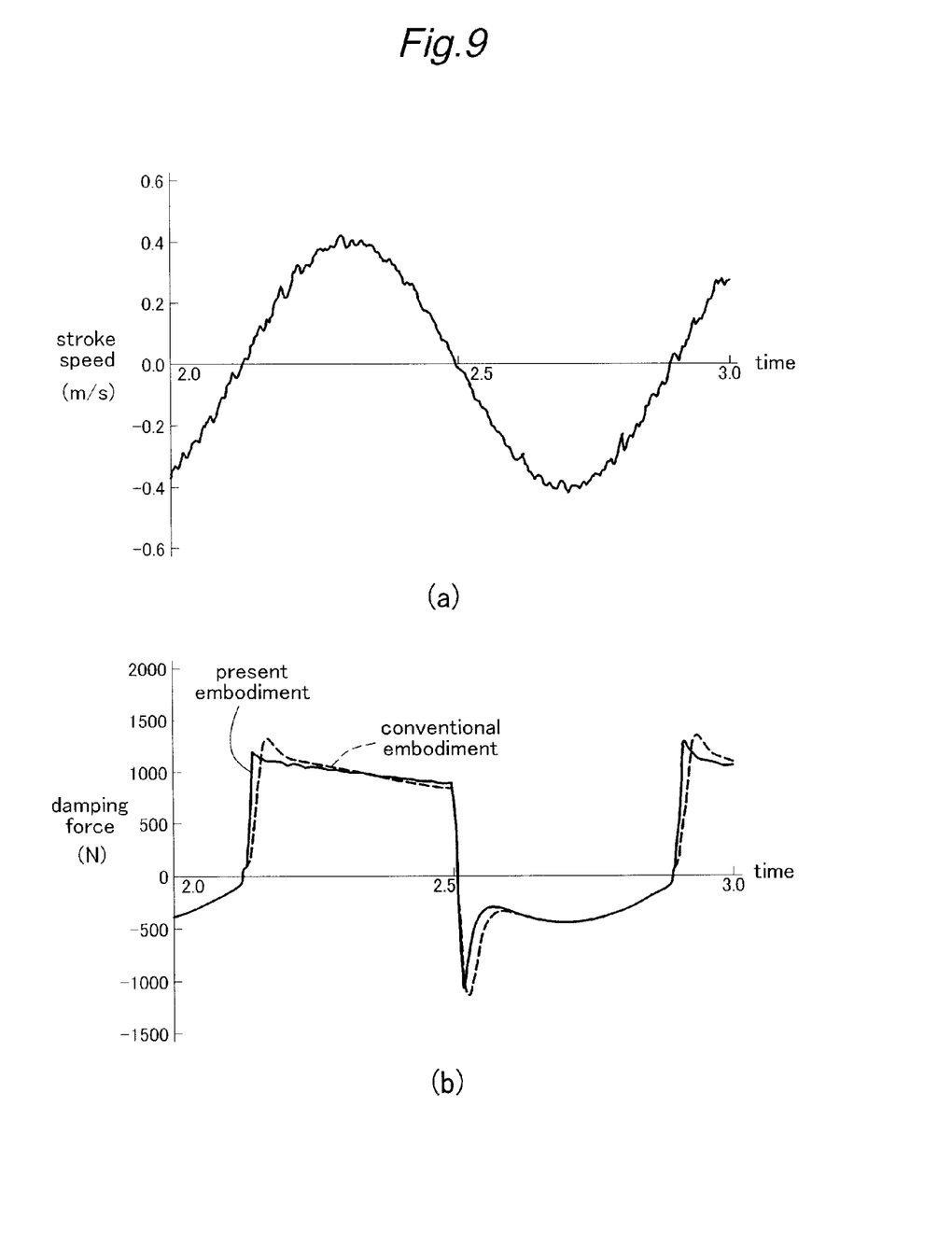
FIGS. 9(a) and 9(b) are graphs showing a change of the stroke speed and damping force regarding the embodiment when the vehicle is traveling on a road with a rough surface.

In step S23, the damper control apparatus 50 selects the first low-pass filter 62 (or the output signal Itgt1), and the process returns to the start. In this way, when the automobile V is running meanderingly on a road with surface irregularities and the stroke speed Ss is oscillating (and thus the direction of the stroke speed Ss changes) with a frequency near the sprung mass resonance frequency as shown in FIG. 9(a), the high response characteristic of the first low-pass filter 62 can suppress the overshoot of the damping force (or target current) at the points where the direction of the damping force of the damper changes, as shown by a solid line in FIG. 9(b), and thus can avoid deterioration of riding comfort. It should be noted that in FIG. 9(b), broken lines show the damping force change in a conventional apparatus.

In step S24, based on the signal from the target damping force selection unit 53, the damper control apparatus 50 determines whether or not the roll control or pitch control is being conducted (or an attitude control of the vehicle body is being conducted) and when neither of them is being conducted, the process goes to step S23 to select the first low-pass filter 62 and returns back to the start. In this way, if the automobile V passes small bumps and dips while traveling straight, the high response characteristics of the first low-pass filter 62 allow the damping force of the damper 4 to change quickly to thereby prevent deterioration of the riding comfort.

Figure 10:
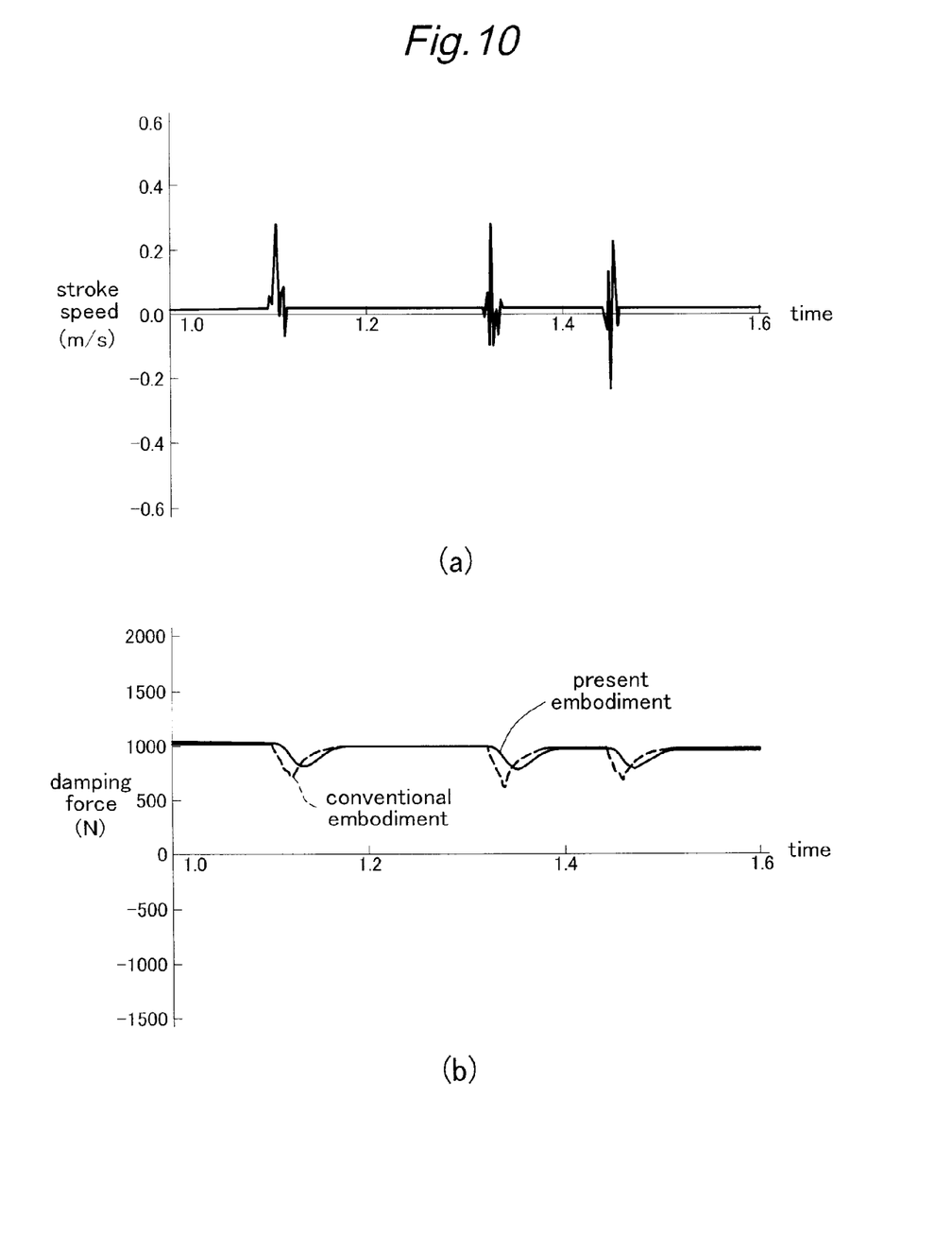
FIGS. 10(a) and 10(b) are graphs showing a change of the stroke speed and damping force regarding the embodiment when the vehicle is traveling on a road with a flat surface.

If the determination result in step S24 is "YES" (i.e., either the roll control or pitch control is being conducted), the process goes to step S25 where the damper control apparatus 50 selects the second low-pass filter 63 (or the output signal Itgt2) and the process goes back to the start. In this way, when the automobile V is making a turn steadily on a flat road surface, if high frequency noises are added to the stroke speed Ss as shown in FIG. 10(a), the decrease of the damping force due to the high frequency noises can be controlled to a moderate degree by the low response characteristic of the second low-pass filter 63 as shown by the solid line in FIG. 10(b), and therefore smooth attitude control of the vehicle body can be maintained. It should be noted that in FIG. 10(b), broken lines show the damping force change in a conventional apparatus.

In the above description, the present invention has been explained in terms of its preferred embodiment, but the present invention should not be limited to the above embodiment. For example, in the above embodiment, the present invention was applied to an MRF-type variable damping force damper but the present invention may be applied to variable damping force dampers utilizing magnetic fluid or variable damping force dampers of a mechanical-type so long as the damping force of the variable damping force dampers can be controlled with electric current. Further, though in the above embodiment the road surface condition was determined based on the stroke speed, it may be possible to alternatively or additionally refer to the vertical acceleration of the vehicle body or wheels, longitudinal or lateral acceleration period of the vehicle body, or any other suitable detectable variables, to determine the road surface condition. In the above embodiment, the base target current was input to both of the first and second low-pass filters but the base target current may be provided to only one of these low-pass filters selected based on the dynamic state of the vehicle body and/or the road surface condition. Thus, it will be apparent to a person having ordinary skill in the art that various alterations and modifications of a concrete structure of the damper control apparatus or concrete control process of the damper control apparatus are possible within the spirit of the present invention.

The disclosure of the original Japanese patent application (Japanese Patent Application No. 2007-206203 filed on Aug. 8, 2007) on which the Paris Convention priority claim is made for the present application is hereby incorporated by reference in its entirety.

The invention claimed is:

1. A control apparatus of a variable damping force damper of a current control type used to suspend a vehicle body of a vehicle, comprising:
 a dynamic state sensor for detecting a dynamic state of the vehicle body;

a road surface condition determination unit for determining a surface condition of a road on which the vehicle is traveling;

a target damping force setting unit for setting a target damping force of the variable damping force damper based on the dynamic state of the vehicle body detected by the dynamic state sensor, the target damping force setting unit performing an attitude control under a prescribed dynamic state of the vehicle body;

a target current setting unit for setting a target current for the variable damping force damper based on the target damping force set by the target damping force setting unit and a stroke speed of the variable damping force damper;

a first low-pass filter for cutting off high frequency components of the target current;

a second low-pass filter for cutting off high frequency components of the target current, the second low-pass filter having a different response characteristic from that of the first low-pass filter; and a low-pass filter selection unit for selecting one of the first and second low-pass filters based on at least one of the dynamic state of the vehicle body detected by the dynamic state sensor and the road surface condition determined by the road surface condition determination unit, the low-pass filter selection unit selecting the first low-pass filter when an irregular road surface is detected by the road surface condition determination unit or when the attitude control is not being performed, and selecting the second low-pass filter when an irregular road surface is not detected by the road surface condition determination unit and the attitude control is being performed.

2. The control apparatus of a variable damping force damper according to claim 1, wherein the road surface condition determination unit determines the road surface condition based on at least one of an operating state of the variable damping force damper and a vertical dynamic state of the vehicle body.

3. The control apparatus of a variable damping force damper according to claim 2, wherein the road surface condition determination unit calculates an oscillation frequency of the variable damping force damper based on the stroke speed, and determines the road surface condition based on the oscillation frequency.

4. The control apparatus of a variable damping force damper according to claim 3, wherein the road surface condition determination unit determines that the road surface has irregularities when the stroke speed exceeds a higher threshold value within a predetermined time period from a point where the stroke speed last becomes lower than a lower threshold value or when the stroke speed becomes lower than the lower threshold value within the predetermined time period from a point where the stroke speed last exceeds the higher threshold value, and otherwise determines that the road surface is flat, the predetermined time period being a half of one cycle of a sprung mass resonance frequency.

5. The control apparatus of a variable damping force damper according to claim 4, wherein the low-pass filter selection unit selects one of the first and second low-pass filters that has a higher response characteristic when the road surface condition determination unit determines that the road surface has irregularities.

6. The control apparatus of a variable damping force damper according to claim 4, wherein the target damping force setting unit provides a signal that can indicate whether or not an attitude control of the vehicle is conducted to the low-pass filter selection unit, and when the road surface condition determination unit determines that the road surface is flat, the low-pass filter selection unit determines whether or not the attitude control of the vehicle body is conducted based on the signal from the target damping force setting unit and selects one of the first and second low-pass filters that has a higher response characteristic when it is determined that the attitude control of the vehicle is not conducted.

7. The control apparatus of a variable damping force damper according to claim 4, wherein the target damping force setting unit provides a signal for indicating whether or not an attitude control of the vehicle is conducted or not to the low-pass filter selection unit, and when the road surface condition determination unit determines that the road surface is flat, the low-pass filter selection unit determines whether or not the attitude control of the vehicle body is conducted based on the signal from the target damping force setting unit and selects one of the first and second low-pass filters that has a lower response characteristic when it is determined that the attitude control of the vehicle is conducted.

8. A method for controlling a variable damping force damper of a current control type used to suspend a vehicle body of a vehicle, the method comprising the steps of:

detecting a dynamic state of the vehicle body;

determining a surface condition of a road on which the vehicle is traveling;

setting a target damping force of the variable damping force damper based on the dynamic state of the vehicle body, an attitude control being performed under a prescribed dynamic state of the vehicle body;

detecting a stroke speed of the variable damping force damper;

setting a target current for the variable damping force damper based on the target damping force and the stroke speed; and cutting off high frequency components of the target current with a low-pass filter, wherein the step of cutting off high frequency components comprises a step of selecting one of a first low-pass filter and a second low-pass filter based on at least one of the dynamic state of the vehicle body and the road surface condition, the first and second low-pass filters having different response characteristics from each other, wherein the first low-pass filter is selected when an irregular road surface is detected or when the attitude control is not being performed, and the second low-pass filter is selected when an irregular road surface is not detected and the attitude control is being performed.

9. The method for controlling a variable damping force damper according to claim 8, wherein the road surface condition is determined based on at least one of an operating state of the variable damping force damper and a vertical dynamic state of the vehicle body.

10. The method for controlling a variable damping force damper according to claim 9, wherein the step of determining a surface condition of a road comprises a step of calculating an oscillation frequency of the variable damping force damper based on the stroke speed, and determining the road surface condition based on the oscillation frequency.

11. The method for controlling a variable damping force damper according to claim 10, wherein it is determined that the road surface has irregularities when the stroke speed exceeds a higher threshold value within a predetermined time period from a point where the stroke speed last becomes lower than a lower threshold value or when the stroke speed becomes lower than the lower threshold value within the predetermined time period from a point where the stroke speed last exceeds the higher threshold value, and otherwise it is determined that the road surface is flat, the predetermined time period being a half of one cycle of a sprung mass resonance frequency.

12. The method for controlling a variable damping force damper according to claim 11, wherein one of the first and second low-pass filters that has a higher response characteristic is selected when it is determined that the road surface has irregularities.

13. The method for controlling a variable damping force damper according to claim 11, further comprising a step of determining whether or not an attitude control of the vehicle is conducted, wherein the step of selecting one of a first low-pass filter and a second low-pass filter selects one of the first and second low-pass filters that has a higher response characteristic when it is determined that the road surface is flat and that the attitude control of the vehicle is not conducted.

14. The method for controlling a variable damping force damper according to claim 11, further comprising a step of determining whether or not an attitude control of the vehicle is conducted, wherein the step of selecting one of a first low-pass filter and a second low-pass filter selects one of the first and second low-pass filters that has a lower response characteristic when it is determined that the road surface is flat and that the attitude control of the vehicle is conducted.

* * * * *